(12) United States Patent
Peng et al.

(10) Patent No.: US 11,803,019 B2
(45) Date of Patent: Oct. 31, 2023

(54) COUPLING ALIGNMENT DEVICE AND METHOD FOR LASER CHIP AND SILICON-BASED OPTOELECTRONIC CHIP

(71) Applicant: UNITED MICROELECTRONICS CENTER CO., LTD, Chongqing (CN)

(72) Inventors: Chao Peng, Chongqing (CN); Junbo Feng, Chongqing (CN); Heng Zhao, Chongqing (CN)

(73) Assignee: UNITED MICROELECTRONICS CENTER CO., LTD, Chongqing (CN)

( * ) Notice: Subject to any disclaimer, the term of this patent is extended or adjusted under 35 U.S.C. 154(b) by 0 days.

(21) Appl. No.: 17/912,588

(22) PCT Filed: Oct. 27, 2020

(86) PCT No.: PCT/CN2020/123977
§ 371 (c)(1),
(2) Date: Sep. 19, 2022

(87) PCT Pub. No.: WO2021/196576
PCT Pub. Date: Oct. 7, 2021

(65) Prior Publication Data
US 2023/0126642 A1 Apr. 27, 2023

(30) Foreign Application Priority Data

Apr. 1, 2020 (CN) .......................... 202010251625.0

(51) Int. Cl.
*H04B 10/00* (2013.01)
*G02B 6/42* (2006.01)
(52) U.S. Cl.
CPC ......... *G02B 6/4231* (2013.01); *G02B 6/4237* (2013.01); *G02B 6/4296* (2013.01)

(58) Field of Classification Search
CPC .. G02B 6/4231; G02B 6/4237; G02B 6/4296; G02B 6/4245; G02B 6/423; G02B 6/4228
See application file for complete search history.

(56) References Cited

U.S. PATENT DOCUMENTS 5,371,822 A * 12/1994 Horwitz ............... G02B 6/4249
385/88
5,446,815 A * 8/1995 Ota ....................... G02B 6/4204
385/83

(Continued)

FOREIGN PATENT DOCUMENTS

| CN | 110082862 A | 8/2019 |
| CN | 111323878 A | 6/2020 |

OTHER PUBLICATIONS

International Search Report in corresponding International Application No. PCT/CN2020/123977, dated Jan. 27, 2021; 3 pgs.

(Continued)

*Primary Examiner* — Agustin Bello
(74) *Attorney, Agent, or Firm* — HAUPTMAN HAM, LLP (57) ABSTRACT

A coupling alignment device and method for a laser chip and a silicon-based optoelectronic chip are disclosed. The device comprises a transfer mold which includes a substrate, first protrusions, and second protrusions. The first protrusions are provided with through holes and are used for being clamped into first recesses in the laser chip; and the second protrusions are used for being clamped into second recesses in the silicon-based optoelectronic chip. The coupling alignment is achieved by etching the first recesses in the laser chip, etching the second recesses in the silicon-based optoelectronic chip, etching the first protrusions, the second protrusions, and the through holes in the transfer mold. A flip-chip suction nozzle is connected with the transfer mold, which is in alignment with the laser chip, and picks up the laser chip (Continued)

by means of the through holes. Then, the laser chip is assembled on the silicon-based optoelectronic chip by aligning and contacting the transfer mold with the silicon-based optoelectronic chip. The method is of high precision, high efficiency, low costs, and can achieve large-scale and mass production.

10 Claims, 10 Drawing Sheets

(56) References Cited

U.S. PATENT DOCUMENTS

| | | | | |
|---|---|---|---|---|
| 5,602,951 A * | 2/1997 | Shiota | ............... | G02B 6/3839 385/71 |
| 5,641,612 A * | 6/1997 | Lee | ............... | G02B 6/4232 438/65 |
| 5,815,621 A * | 9/1998 | Sakai | ............... | G02B 6/3834 264/1.24 |
| 6,118,917 A * | 9/2000 | Lee | ............... | G02B 6/30 385/52 |
| 6,160,936 A * | 12/2000 | You | ............... | G02B 6/30 385/52 |
| 6,222,967 B1* | 4/2001 | Amano | ............... | G02B 6/424 385/88 |
| 6,293,711 B1* | 9/2001 | Sasaki | ............... | G02B 6/4257 385/91 |
| 6,296,789 B1* | 10/2001 | Go | ............... | G02B 6/4243 264/1.25 |
| 6,599,032 B1* | 7/2003 | Kurashima | ............... | G02B 6/4249 385/24 |
| 6,621,961 B2* | 9/2003 | Alibert | ............... | G02B 6/423 385/91 |
| 6,709,607 B2* | 3/2004 | Hibbs-Brenner | .... | G02B 6/4214 216/24 |
| 6,826,324 B2* | 11/2004 | Steinberg | ............... | G02B 6/3502 385/20 |
| 6,842,552 B1* | 1/2005 | Steinberg | ............... | G02B 6/3506 385/20 |
| 7,010,199 B2* | 3/2006 | Kim | ............... | G02B 6/3636 385/52 |
| 7,254,301 B2* | 8/2007 | Hoshino | ............... | G02B 6/423 385/94 |
| 7,410,303 B2* | 8/2008 | Sakurai | ............... | G02B 6/3865 385/78 |
| 7,454,105 B2* | 11/2008 | Yi | ............... | G02B 6/4232 257/E27.001 |
| 9,323,012 B1* | 4/2016 | Sun | ............... | G02B 6/4224 |
| 9,575,267 B1* | 2/2017 | Shastri | ............... | G02B 6/423 |
| 9,638,859 B1* | 5/2017 | Nuttall | ............... | G02B 6/4274 |
| 10,048,455 B2* | 8/2018 | Pfnuer | ............... | G02B 6/423 |
| 10,598,861 B2* | 3/2020 | Kulick | ............... | G02B 6/43 |
| 11,493,705 B2* | 11/2022 | Shikama | ............... | G02B 6/4219 |
| 2001/0033721 A1* | 10/2001 | Mori | ............... | G02B 6/4231 385/88 |
| 2002/0034362 A1* | 3/2002 | Yamazaki | ............... | G02B 6/30 385/80 |
| 2002/0090180 A1* | 7/2002 | Silverbrook | ............... | G02B 6/4204 385/139 |
| 2003/0044128 A1* | 3/2003 | Crane, Jr. | ............... | G02B 6/4201 385/92 |
| 2004/0218849 A1* | 11/2004 | Blauvelt | ............... | G02B 6/42 385/14 |
| 2005/0281515 A1* | 12/2005 | Togami | ............... | G02B 6/4204 385/93 |
| 2008/0226222 A1* | 9/2008 | Kim | ............... | G02B 6/423 427/163.2 |
| 2010/0061683 A1* | 3/2010 | Sasaki | ............... | G02B 6/4214 385/88 |
| 2011/0085760 A1* | 4/2011 | Han | ............... | G02B 6/423 385/14 |
| 2011/0286690 A1* | 11/2011 | Deliwala | ............... | G02B 6/423 257/E21.536 |
| 2011/0316579 A1* | 12/2011 | Ryu | ............... | G01R 31/2887 324/762.07 |
| 2013/0230278 A1* | 9/2013 | Hung | ............... | G02B 6/4296 385/14 |
| 2014/0199019 A1* | 7/2014 | Yabre | ............... | G02B 6/428 385/14 |
| 2015/0338586 A1* | 11/2015 | Sunaga | ............... | G02B 6/4292 385/33 |
| 2016/0282570 A1* | 9/2016 | Nishimura | ............... | G02B 6/4227 |
| 2016/0291265 A1* | 10/2016 | Kinghorn | ............... | G02B 6/4238 |
| 2017/0357062 A1* | 12/2017 | Watanabe | ............... | G02B 6/4255 |
| 2017/0357065 A1* | 12/2017 | Watanabe | ............... | G02B 6/428 |
| 2020/0096713 A1* | 3/2020 | Meister | ............... | G02B 6/4249 |
| 2020/0096715 A1* | 3/2020 | Dong | ............... | G02B 6/4257 |
| 2021/0048587 A1* | 2/2021 | Denoyer | ............... | G02B 6/4249 |
| 2021/0392419 A1* | 12/2021 | Meister | ............... | G02B 6/423 |
| 2022/0050245 A1* | 2/2022 | Peng | ............... | G02B 6/12004 |
| 2022/0390689 A1* | 12/2022 | Itakura | ............... | H01S 5/02326 |
| 2023/0102967 A1* | 3/2023 | Witmer | ............... | G02B 6/423 385/139 |
| 2023/0126642 A1* | 4/2023 | Peng | ............... | G02B 6/423 385/88 |
| 2023/0141467 A1* | 5/2023 | Guo | ............... | G02B 6/423 29/832 |

OTHER PUBLICATIONS

First Office Action in corresponding Chinese Application No. 202010251625.0, dated Feb. 7, 2021; 9 pgs.
Second Office Action in corresponding Chinese Application No. 202010251625.0, dated Jun. 16, 2021; 11 pgs.

* cited by examiner

COUPLING ALIGNMENT DEVICE AND METHOD FOR LASER CHIP AND SILICON-BASED OPTOELECTRONIC CHIP

RELATED APPLICATIONS

The present application is a U.S. National Phase of International Application Number PCT/CN2020/123977 filed Oct. 27, 2020 and claims priority to Chinese Application Number 202010251625.0 filed Apr. 1, 2020.

TECHNICAL FIELD

The present disclosure relates to the technical field of packaging of silicon-based optoelectronic devices, and more particularly, to coupling alignment device and method for laser chip and silicon-based optoelectronic chip.

BACKGROUND ART

Silicon is an indirect bandgap semiconductor, with low luminous efficiency, so silicon is always considered as unsuitable light source materials; therefore, the light sources integration has become a very important work in silicon-based optoelectronic technology.

Generally, the light source integration method of silicon-based optoelectronic technology is directly attaching a light source on a silicon-based optoelectronic chip. Generally a laser chip is directly attached on the silicon-based optoelectronic chip by flip-chip bonding, and then the light is coupled into a waveguide of the silicon-based optoelectronic chip by edge coupler or grating coupler. For example, the light source is grating coupled into the silicon waveguide by a hermetic packaging scheme, or the alignment is achieved by a mechanical positioning scheme repeatedly. Obviously, in the prior art, issues such as fixing, power-on, heat dissipation, and alignment must be considered at the same time, so it is difficult to accrue the coupling accuracy in the process of directly attaching the laser chip. The repeated alignment process leads to a problem of low coupling efficiency, and the high-precision attachment equipment brings a problem of high packaging cost. According to historical statistics, the coupling packaging cost of integrated optoelectronic chips accounts for about 80% of the total cost of the final device, and the coupling-related loss of silicon-based optoelectronic chips accounts for about 50% of the total consumption of the entire device.

The flip-chip bonding in the present silicon-based optoelectronic chip and laser chip packaging technology is a highly feasible solution. The silicon-based optoelectronic chip and the laser chip are aligned by a positioning apparatus, which is cured by glue, thereby ensuring high accuracy. However, the technology has the following shortcomings. First, the positioning apparatus needs to be completely fixed in order to align the silicon-based optoelectronic chip and the laser chip, that is, the alignment accuracy of the silicon-based optoelectronic chip and the laser chip is completely dependent on the alignment of the positioning apparatus, thus the requirements for the curing glue used in the packaging process are relatively high. Second, once the positioning apparatus is impacted by external factors, the alignment accuracy will be low. Third, the packaging process of the positioning apparatus is difficult, and needs to position and align repeatedly to ensure the accuracy. Fourth, the more complex packaging process will inevitably lead to more time costs and lower efficiency. Fifth, it is not sure that large-scale and mass-produced packaging of silicon-based optoelectronic chips and laser chips can be achieved by the technology.

Therefore, how to significantly improve the coupling alignment efficiency and accuracy of the laser chip and the silicon-based optoelectronic chip, and effectively reduce the coupling alignment cost, improve the packaging efficiency, and achieve large-scale mass production in the premise of ensuring the reliability of the coupling alignment has become an urgent technical problem to be solved and the focus of the research in the field.

Technical Problem

Embodiments of the present disclosure provide a coupling alignment device and method for laser chip and silicon-based optoelectronic chip. By aligning and contacting the laser chip and the silicon-based optoelectronic chip with a transfer mold respectively, the laser chip is skillfully transferred to an accommodating chamber of the silicon-based optoelectronic chip, and the transfer package is completed. Therefore, the coupling package of the laser chip and the silicon-based optoelectronic chip can be completed with high efficiency, high precision and low cost. Besides, by innovatively designing the alignment shapes of the protrusion and the groove, the work efficiency of coupling alignment is improved, thereby realizing batch packaging of laser chips. The coupling alignment method for laser chip and silicon-based optoelectronic chip according to embodiments of the present disclosure is a coupling packaging technology of the laser chip and the silicon-based optoelectronic chip based on transfer and flip-chip, which can significantly reduce the difficulty of the packaging process, thereby better solving the problems existing in the prior art such as low efficiency, low precision and high cost.

SUMMARY OF THE INVENTION

Embodiments of the present disclosure provide the following technical solutions:

In a first aspect, embodiments of the present disclosure provide a coupling alignment device for laser chip and silicon-based optoelectronic chip, comprising a transfer mold, the transfer mold comprises a substrate, a first protrusion and a second protrusion; the first protrusion and the second protrusion are both fixedly connected to the substrate; the first protrusion of the transfer mold is etched to form a through hole, which penetrates through the first protrusion and the substrate; the first protrusion is used to be inserted into a first groove of the laser chip, and the second protrusion is used to be inserted into a second groove of the silicon-based optoelectronic chip.

In some embodiments, the height of the first protrusion is greater than the depth of the first groove.

In some embodiments, the height of the second protrusion is greater than the depth of the second groove.

In some embodiments, the first protrusion and the second protrusion are located under the substrate.

In some embodiments, the substrate, the first protrusion and the second protrusion are integrated into one structure.

In some embodiments, a cross section of the first protrusion and/or the second protrusion is a polygon.

In some embodiments, the number of the first protrusions is multiple and the number of the second protrusions is multiple.

In a second aspect, embodiments of the present disclosure provide a coupling alignment method for laser chip and silicon-based optoelectronic chip, wherein the method comprising the following steps:

step S1: determining the depth of a first groove on a laser chip according to a first stop layer of the laser chip, determining the depth of a second groove on a silicon-based optoelectronic chip according to a second stop layer of the silicon-based optoelectronic chip, determining the height of a first protrusion to be formed on a transfer mold according to the depth of the first groove, determining the height of a second protrusion to be formed on the transfer mold according to the depth of the second groove, and determining the height difference between the first protrusion and the second protrusion;

step S2: etching a plurality of the first grooves on the laser chip, and stopping at an upper surface of the first stop layer; etching a plurality of the second grooves on the silicon-based optoelectronic chip, and stopping at an upper surface of the second stop layer;

step S3: etching a plurality of the first protrusions corresponding to a plurality of the first grooves one-to-one and a plurality of the second protrusions corresponding to a plurality of the second grooves one-to-one on the transfer mold; wherein, the number of the first protrusions is the same as the number of the first grooves, the number of the second protrusions is the same as the number of the second grooves, the height of the first protrusion is greater than the depth of the first groove, and the height of the second protrusion is greater than the depth of the second groove;

step S4: etching through holes which penetrate through the first protrusion and the substrate on the transfer mold, and the number of the through holes is the same as the number of the first protrusions;

step S5, connecting a flip-chip welding tip to the transfer mold, the transfer mold is aligned and contacted with the laser chip by fixing the first protrusions and the first grooves one-to-one correspondingly, and the flip-chip welding tip pick up the laser chip via the through holes of the transfer mold;

step S6: making the transfer mold in alignment and contacting with the silicon-based optoelectronic chip by fixing the second protrusions and the second grooves one to one correspondingly, and putting the laser chip into the accommodating chamber of the silicon-based optoelectronic chip, then completing coupling alignment of the laser chip and the silicon-based optoelectronics chip In some embodiments, in the step S1, a bottom surface of the first groove is the upper surface of the first stop layer of the laser chip, and a bottom surface of the second groove is the upper surface of the second stop layer of the silicon-based optoelectronic chip;

a height difference between the first protrusion and the second protrusion is a height difference between the top surface of the first protrusion and the top surface of the second protrusion, and the height difference between the top surface of the first protrusion and the top surface of the second protrusion is determined as follows;

$$\Delta h = h1 - h2 - t1 - 0.5 \cdot t2 + 0.5 \cdot t3;$$

wherein, $\Delta h$ represents the height difference between the top surface of the first protrusion and the top surface of the second protrusion, $h1$ represents a height difference between the center of the second stop layer and the center of a second waveguide layer of the silicon-based optoelectronic chip, $h2$ represents the height difference between the center of a first waveguide layer and the center of the second waveguide layer when the laser chip and the silicon-based optoelectronic chip are optimally coupled, $t1$ represents the thickness of the first stop layer of the laser chip, $t2$ represents the thickness of the first waveguide layer of the laser chip, and $t3$ represents a thickness of the second stop layer of the silicon-based optoelectronic chip.

In some embodiments, the method further comprising step S7: after curing the glue in the accommodating chamber where the laser chip is placed by flip-chip, turning off vacuum, the flip-chip welding tip and the transfer mold leave the laser chip at the same time and enter into the next coupling alignment experiment of laser chips and silicon-based optoelectronic chips.

Beneficial Effect

The beneficial effects of the present disclosure are:
(1) The disclosure ensures the self-alignment of the laser chip and the silicon-based optoelectronic chip by the transfer mold, and realizes high-precision alignment by the shape design of the protrusion and the groove. The transfer mold does not need to be fixed with the laser chip and the silicon-based optoelectronic chip using curing glue. The transfer mold is used as a positioning apparatus during the alignment process, and does not need to be fixed on the laser chip for a long time. With the help of the flip-chip welding tip and the positioning of the first protrusion and groove, the positioning the laser chip is simple, stable and accurate. The present disclosure simplifies the alignment method by the transfer mold, and does not need to perform multi-step alignment process, thereby improving the efficiency and reducing the time cost. The transfer mold can be used repeatedly, and large-scale and mass-produced packaging of silicon-based optoelectronic chips and laser chips can be realized.
(2) The transfer mold of the present disclosure has the following beneficial effects as a positioning apparatus: by designing the shape of the protrusion and grooves, flip-chip of the transfer mold with high-precision alignment can be accomplished, resulting that the proportion of coupling-related loss of the silicon-based optoelectronic chip to the total device consumption can be reduced; the flexibility of the positioning apparatus reduces the complexity of the packaging process; the simplicity of the positioning apparatus makes the processing simple; the positioning apparatus can be recycled to complete the packaging of silicon-based optoelectronic chips and laser chips for many times, reducing production costs and time costs; the simplicity of the process flow makes the packaging of laser chips and silicon-based optoelectronic chips simple, reducing the packaging complexity, thereby reducing packaging errors, and directly reducing the packaging loss; packaging can be large-scale, mass-produced, and a single transfer mold can complete the packaging of the laser chip and the silicon-based optoelectronic chip for many times, so the total packaging cost of the silicon-based optoelectronic chip and the laser chip can be reduced.

BRIEF DESCRIPTION OF THE DRAWINGS

In order to illustrate the technical solutions in embodiments of the present disclosure more clearly, the following briefly introduces the accompanying drawings used in the description of each embodiment. Obviously, the drawings in the following description are only some embodiments of the present disclosure. For those skilled in the art, other drawings can also be obtained according to the drawings in the following detailed description of the present disclosure without creative effort.

In the drawings:
1. laser chip; 11. first groove; 12. first stop layer; 13. first waveguide layer;
2. silicon-based optoelectronic chip; 21. second groove; 22. second stop layer; 23. second waveguide layer; 24. accommodating chamber;
3. transfer mold; 31. first protrusion; 32. second protrusion; 33. through hole; 34. substrate;
4. flip-chip welding tips.

DETAILED DESCRIPTION OF EMBODIMENTS

The technical solutions of the coupling alignment device and method for a laser chip and a silicon-based optoelectronic chip provided by the present disclosure will be clearly and completely described below with reference to the accompanying drawings. Obviously, the described embodiments are only a part of the embodiments of the present disclosure, and not all embodiments. Based on the embodiments of the present disclosure, all other embodiments obtained by those skilled in the art without creative efforts shall fall within the protection scope of the present disclosure.

In the present disclosure, the word "exemplary" is used to mean "serving as an example, instance or illustration". Any embodiment of this disclosure described as "exemplary" is not necessarily to be construed as preferred or advantageous over other embodiments. The following description is presented to enable any person skilled in the art to make and use the present disclosure. In the following description, details of the disclosure are set forth for the purpose of explanation. It should be understood that those of ordinary skill in the art may realize that the present disclosure may be practiced without the use of these specific details. In other instances, well-known structures and procedures have not been described in detail so as not to obscure the description of the present disclosure with unnecessary detail. Thus, the present disclosure is not intended to be limited to the embodiments shown but is to be accorded the widest scope consistent with the principles and features disclosed herein.

It should be understood that the terms described in the present disclosure are only used to describe particular embodiments, and are not used to limit the present disclosure. Additionally, for numerical ranges in the present disclosure, it should be understood that the upper and lower limits of the range, and every intervening value therebetween, are specifically disclosed. Every smaller range between any stated value or intervening value in a stated range and any other stated value or intervening value in that stated range is also encompassed within the disclosure. The upper and lower limits of these smaller ranges may independently be included or excluded in the range. "%" in the present disclosure represents mass percentage unless otherwise specified.

Unless otherwise defined, all technical and scientific terms used herein have the same meaning as commonly understood by those of ordinary skill in the art to which this disclosure relates. Although only the preferred methods and materials are described herein, any methods and materials similar or equivalent to those described herein can also be used in the practice or testing of the present disclosure. All documents mentioned in this specification are incorporated by reference for the purpose of disclosing and describing the methods and/or materials in connection with which the documents are referred. In the event of conflict with any incorporated document, the content of this specification controls.

Furthermore, the terms "first", "second", "third", etc. are used for descriptive purposes only, and should not be understood as indicating or implying relative importance or implying the number of technical features indicated. Thus, features defined with "first", "second", "third" may expressly or implicitly include one or more features. In the description of the present disclosure, "plurality" means two or more, unless otherwise expressly and specifically defined.

This embodiment specifically discloses a coupling alignment device between a laser chip and a silicon-based optoelectronic chip, which realizes the coupling and alignment of the laser chip and the silicon-based optoelectronic chip through a specially designed transfer mold with a simple structure. A coupling packaging technology of laser chip and silicon-based optoelectronic chip based on transfer printing and flip-chip welding is realized, which has high alignment accuracy, high efficiency and low cost, and can realize the large-scale and mass production of laser chip and silicon-based optoelectronic chip packaging.

Figure 1:
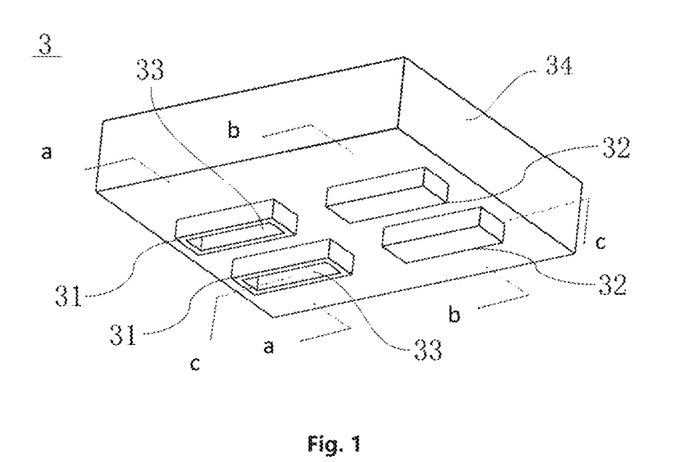
FIG. 1 is a schematic structural diagram of a transfer mold having a first protrusion, a second protrusion and a through hole.

As shown in FIG. 1, the coupling alignment device for the laser chip and the silicon-based optoelectronic chip comprises: a transfer mold 3; the transfer mold 3 includes a substrate 34, a first protrusion 31 and a second protrusion 32, the first protrusion 31 and the second protrusion 32 are both fixedly connected to the substrate 34. The first protrusion 31 of the transfer mold 3 is etched to form a through hole 33, which penetrates though the first protrusion 31 and the substrate 34. The first protrusion 31 is used to be inserted into the first groove 11 of the laser chip 1, and the second protrusion 32 is used to be inserted into the second groove 21 of the silicon-based optoelectronic chip 2.

Figure 2:
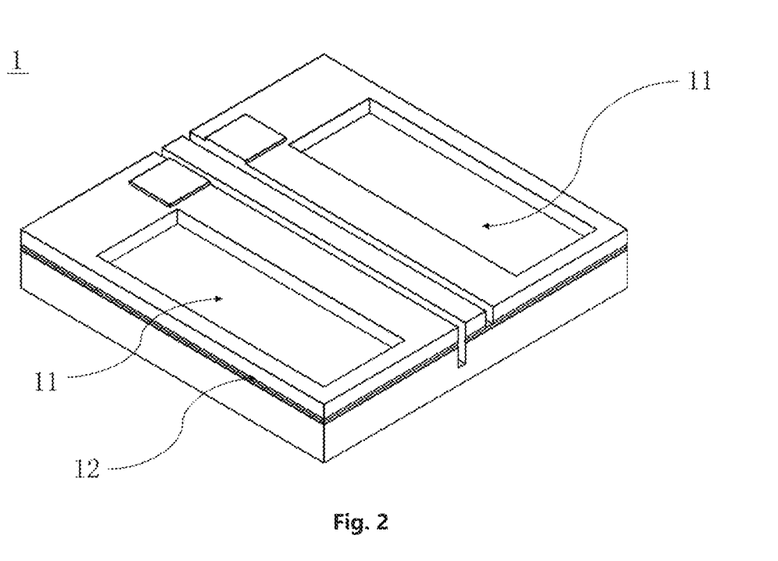
FIG. 2 is a schematic perspective structure diagram of a laser chip having a first groove.

As shown in FIG. 2, the laser chip 1 is provided with the first groove 11 matching the first protrusion 31. The first protrusion 31 is inserted into the first groove 11, and the height of the first protrusion 31 is greater than the depth of the groove 11. The first protrusion 31 mounts with the first groove 11, and an allowable tolerance is set under the condition of ensuring mounting accuracy. A self-alignment is achieved by the higher mounting accuracy or a minor displacement along a single axial direction, that is, the central axes of the first protrusion 31 and the first groove 11 are coincident, which restricts the movement in the height direction and ensures the accuracy in the height direction.

Figure 3:
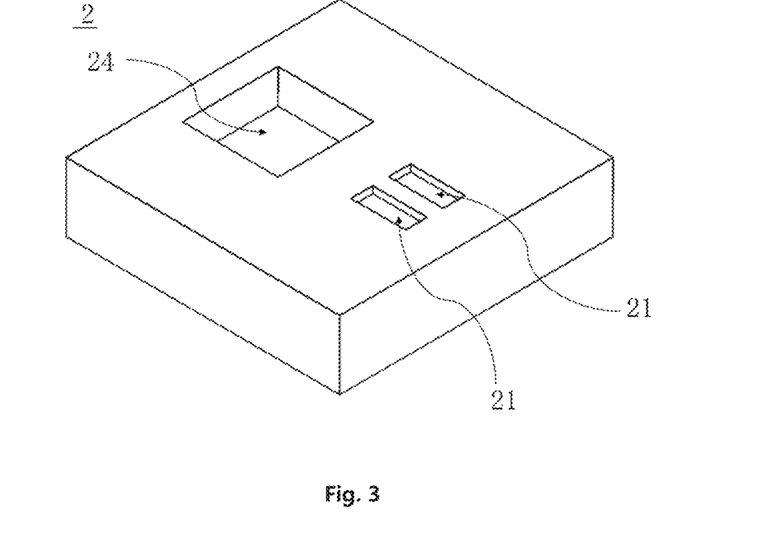
FIG. 3 is a schematic perspective structural diagram of a silicon-based optoelectronic chip having a second groove and an accommodating chamber.

As shown in FIG. 3, the silicon-based optoelectronic chip 2 is provided with a second groove 21 matching the second protrusion 32. The second protrusion 32 is inserted into the second groove 21, and the height of the second protrusion 32 is greater than the depth of the second groove 21. The second protrusion 32 forms a fit with the second groove 21, and an allowable tolerance is set under the condition of ensuring fit accuracy. A self-alignment is formed by the higher fit accuracy or a minor displacement along a single axial direction, that is, the central axes of the second protrusion 32 and the second groove 21 are coincident, which restricts the movement in the height direction and ensures the accuracy in the height direction. The silicon-based optoelectronic chip 2 is provided with an accommodating chamber 24 for placing the laser chip 1. After the second protrusion 32 is aligned with the second groove 21, the laser chip 1 is put into the accommodating chamber 24, and the accommodating chamber 24 is provided with glue for mounting and curing.

Figure 4:
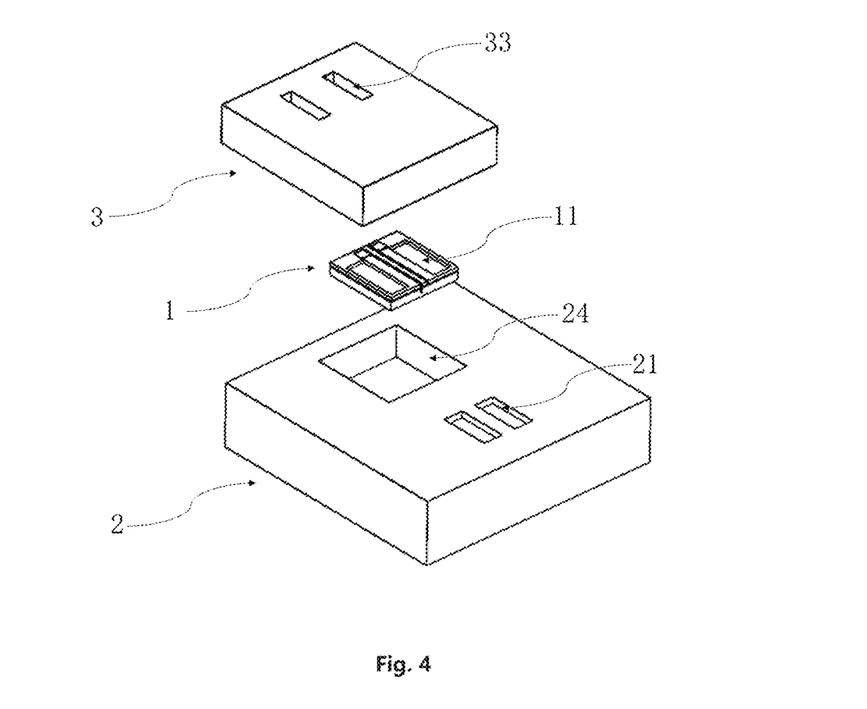
FIG. 4 is a schematic diagram of an exploded structure of the assembly relationship among the laser chip, the silicon-based optoelectronic chip and the transfer mold.
Figure 5:
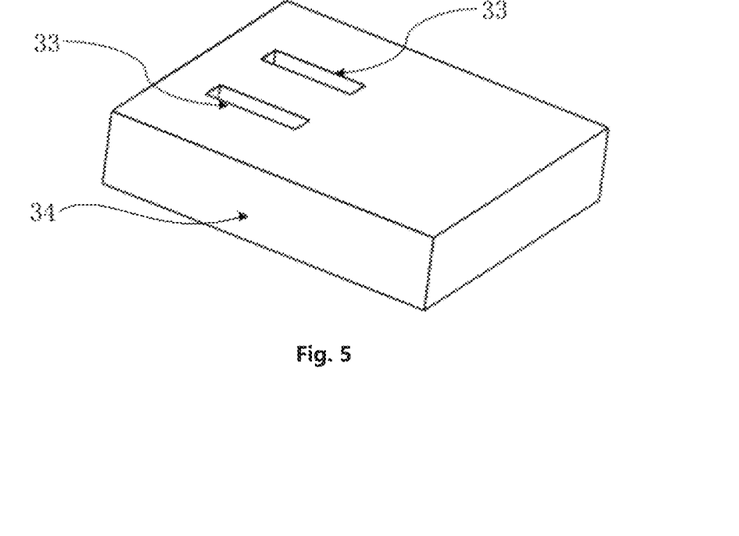
FIG. 5 is a schematic view of the top structure of a transfer mold with through holes.
Figure 6:
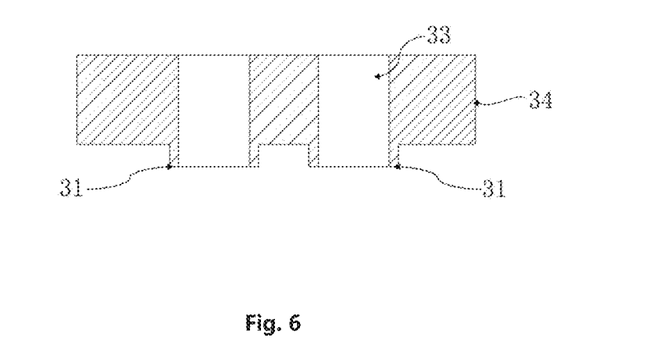
FIG. 6 is a schematic diagram of a-a cross-sectional structure in FIG. 1.
Figure 7:
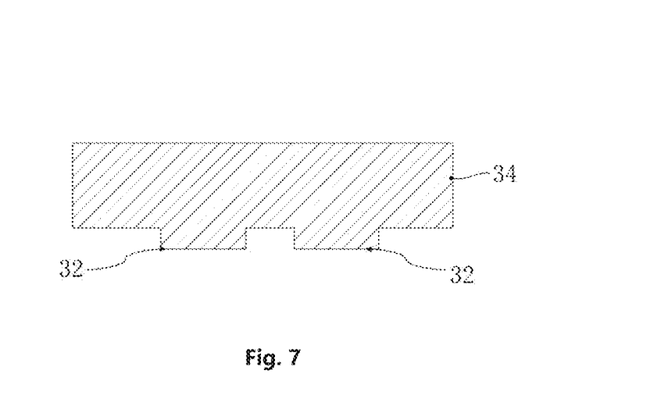
FIG. 7 is a schematic diagram of b-b cross-sectional structure in FIG. 1.
Figure 8:
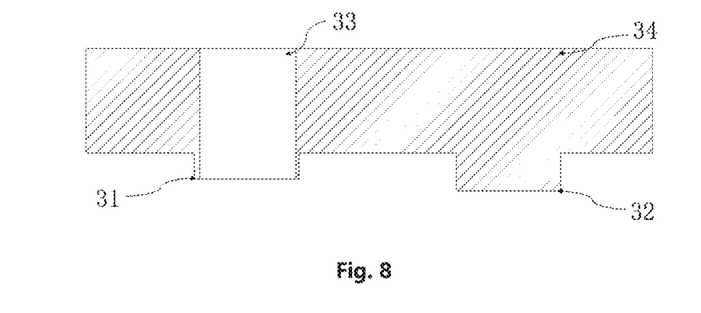
FIG. 8 is a schematic diagram of c-c cross-sectional structure in FIG. 1.

During the transfer process, the relative positional relationship between the transfer mold 3, the laser chip 1 and the silicon-based optoelectronic chip 2 is shown in FIG. 4. The transfer mold 3 is aligned and contacted with the laser chip 1 and the silicon-based optoelectronic chip 2 respectively, thereby realizing the coupling alignment of the laser chip 1 and the silicon-based optoelectronic chip 2, so that the optical field of the first waveguide layer 13 of the laser chip 1 is coupled and aligned with the optical field of the second waveguide layer 23 of the base optoelectronic chip 2.

As shown in FIGS. 1, 5-8, the transfer mold 3 of this embodiment is an integrated structure composing of a substrate 34, a first protrusion 31 and a second protrusion 32 obtained by etching. The through hole 33 is also obtained by etching. Preferably, a dry etching method is used in this embodiment.

In some embodiments, as shown in FIGS. 1, 6-8, the first protrusions 31 and the second protrusions 32 are located under the substrate 34. The number of the first protrusion 31 and the number of the second protrusion 32 are both plural. Preferably, the number of the first protrusions 31 is two, and the number of the second protrusions 32 is two. In this embodiment, as shown in FIG. 1, two first protrusions 31 are arranged side by side, two second protrusions 32 are arranged side by side, and the two first protrusions 31 in a line and the two second protrusions 32 in a line are arranged in a row. Those skilled in the art can also set the positional relationship between the second protrusion 32 and the first protrusion 31 according to actual needs. For example, two second protrusions and two first protrusions are located in the same row, and two second protrusions 32 are located on the left and right sides of the two first protrusions 31 in the same row. During assembly, the accommodating chamber 24 of the silicon-based optoelectronic chip 2 is correspondingly located under the first protrusion 31. By aligning and fixing the first protrusion with the first groove, the second protrusion and the second groove, the laser chip 1 is placed into the accommodating chamber 24 to realize coupling alignment of the light field of the first waveguide layer 13 of the laser chip 1 and the light field of the second waveguide layer 23 of the silicon-based optoelectronic chip 2. As shown in FIGS. 2 and 4, the laser chip 1 with a coplanar electrode structure is selected in this embodiment, that is, the P pole and the N pole of the laser chip 1 are on the same side of the laser chip 1. More specifically, the P and N poles of the laser chip 1 are on the upper surface of the laser chip 1 to facilitate subsequent electrical connection.

Figure 9A:
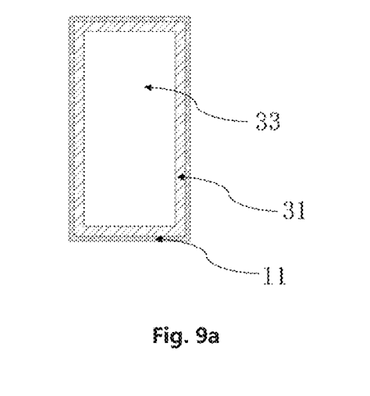
FIG. 9a is a schematic diagram of the cross-sectional shape of the first protrusion, the first groove and the through hole in the first embodiment.
Figure 9B:
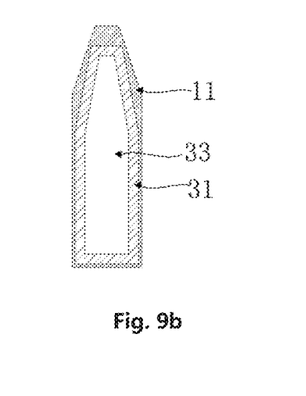
FIG. 9b is a schematic diagram of the cross-sectional shape of the first protrusion, the first groove and the through hole in the second embodiment.
Figure 9C:
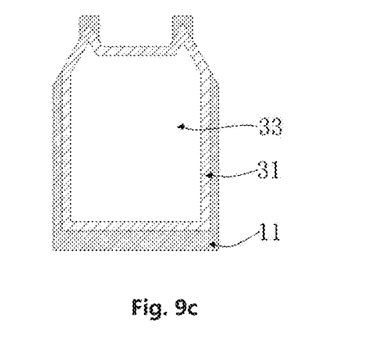
FIG. 9c is a schematic diagram of the cross-sectional shape of the first protrusion, the first groove and the through hole in the third embodiment.
Figure 10A:
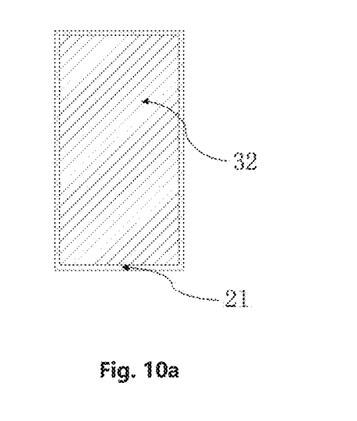
FIG. 10a is a schematic diagram of the cross-sectional shape of the second protrusion and the second groove in the first embodiment.
Figure 10B:
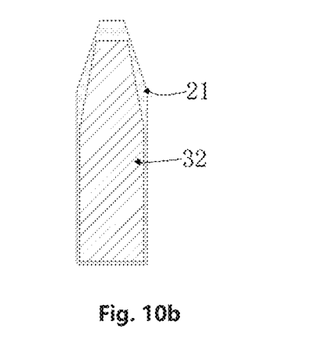
FIG. 10b is a schematic diagram of the cross-sectional shape of the second protrusion and the second groove in the second embodiment.
Figure 10C:
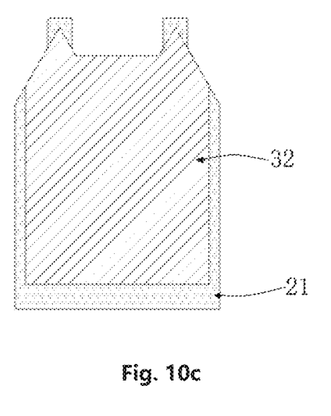
FIG. 10c is a schematic diagram of the cross-sectional shape of the second protrusion and the second groove in the third embodiment.

The cross section of the first protrusion 31 and/or the second protrusion 32 is polygonal. As shown in FIGS. 9a-9c, the first protrusion 31 is quadrilateral, hexagonal, octagonal, etc., the first groove 11 is also a corresponding matching shape, and the through hole 33 is also a corresponding matching shape. As shown in FIGS. 10a-10c, the second protrusion 32 is quadrilateral, hexagonal, octagonal, etc., and the second groove 21 is also a corresponding matching shape. Through this specially designed alignment shape, the rotation and movement in horizontal directions are limited, and the alignment accuracy is high.

The cross-sectional shapes of the protrusion, groove and through hole can be equilateral polygons or unequal polygons, as long as the alignment operation is simple and the effect of restricting rotation and movement horizontally is sufficient.

Figure 11:
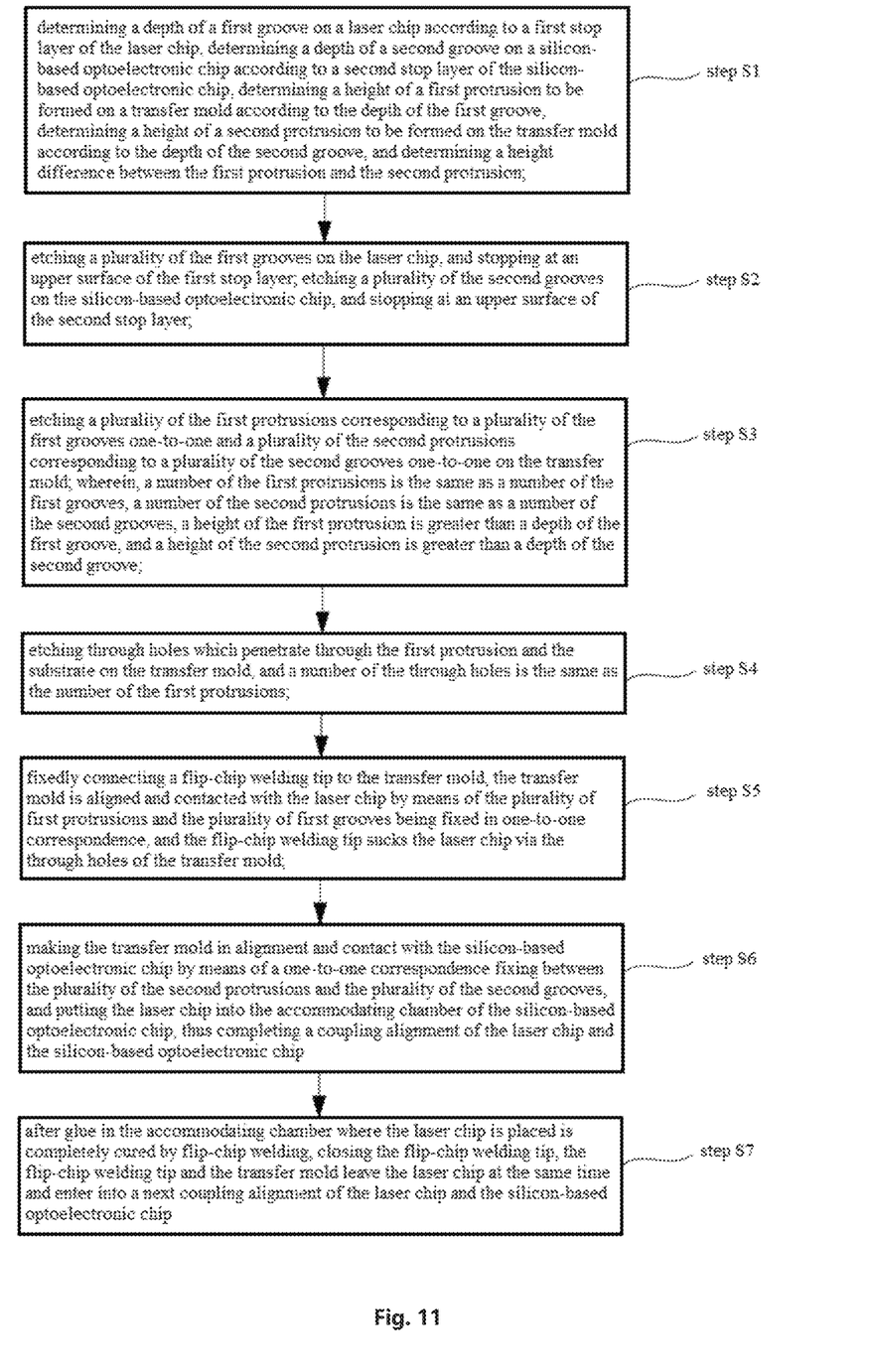
FIG. 11 is a schematic flowchart of a coupling alignment method for a laser chip and a silicon-based optoelectronic chip.

This embodiment also provides a coupling alignment method for laser chip and silicon-based optoelectronic chip. The coupling alignment method is based on the same inventive idea as the above coupling alignment device, that is, based on transfer and flip-chip welding of the laser chip and the silicon-based optoelectronic chip coupling package. As shown in FIG. 11, the method specifically includes the following steps:

Step S1: determining the depth of the first groove 11 of the laser chip 1 according to the first stop layer 12 of the laser chip 1, in this embodiment, the first groove 11 is etched downward to the upper surface of the first stop layer 12 and stops, the bottom surface of the first groove is the upper surface of the first stop layer of the laser chip; determining the depth of the second groove 21 of the silicon-based optoelectronic chip 2 according to the second stop layer 22 of the silicon-based optoelectronic chip 2, in this embodiment, the second groove 21 is etched down to the upper surface of the second stop layer 22 and stops, the bottom surface of the second groove is the upper surface of the second stop layer of the silicon-based optoelectronic chip; determining the height of the first protrusion 31 formed on the transfer mold 3 according to the depth of the first groove 11, the height of the first protrusion 31 is greater than the depth of the first groove 11; determining the height of the second protrusion 32 formed on the transfer mold 3 according to the depth of the second groove 21, the height of the second protrusion 32 is greater than the depth of the second groove 21; and determining the height difference Δh between the first protrusion 31 and the second protrusion 32.

Figure 18:
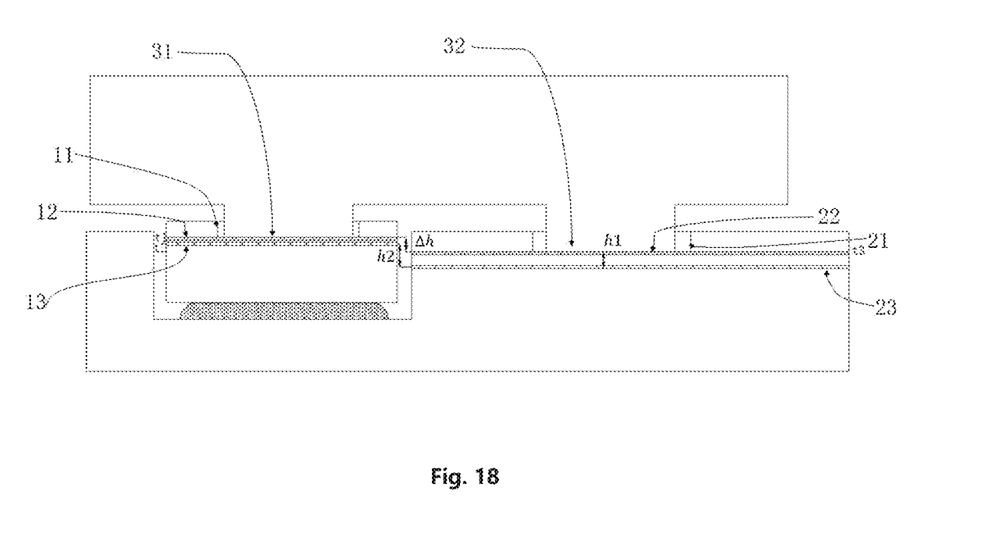
FIG. 18 is a schematic diagram of the relative positional relationship between the laser chip and the silicon-based optoelectronic chip.

In this embodiment, as shown in FIG. 18, the height difference between the first protrusion 31 and the second protrusion 32 is the height difference between the top end surface of the first protrusion 31 and the top end surface of the second protrusion 32. The height difference between the top end surface of the protrusion 31 and the top end surface of the second protrusion 32 is determined as follows;

$$\Delta h = h1 - h2 - t1 - 0.5 \cdot t2 + 0.5 \cdot t3;$$

Here, Δh represents the height difference between the top surface of the first protrusion and the top surface of the second protrusion, h1 represents the height difference between the center of the second stop layer and the center of the second waveguide layer of the silicon-based optoelectronic chip, h2 represents the height difference between the center of the first waveguide layer and the center of the second waveguide layer when the laser chip and the silicon-based optoelectronic chip are optimally coupled, t1 represents the thickness of the first stop layer of the laser chip, t2 represents the thickness of the first waveguide layer of the laser chip, and t3 represents the thickness of the second stop layer of the silicon-based optoelectronic chip.

The embodiments of the present disclosure innovatively calculate the positional relationship between the heights of the ends of the first protrusion 31 and the second protrusion 32 through the positional relationship between the stop layer, the laser light spot and the silicon waveguide, and realize the self-alignment in height through a precise micro-machining process.

Step S2: etching a plurality of first grooves 11 on the top surface of the laser chip 1, stopping at the upper surface of the first stop layer 12, and accurately determining the depths of the first stop layer 12 and the first groove 11 through a SEM electron microscope image, the first groove 11 is used for the alignment of the transfer mold 3; etching a plurality of the second grooves 21 on the silicon-based optoelectronic chip 2, stopping at the upper surface of the second stop layer 22, and accurately determining the depths of the second stop layer 22 and the second groove 21 through a SEM electron microscope image, the second groove 21 is used for the alignment of the transfer mold 3; as shown in FIG. 18, in this embodiment, the bottom surface of the first groove 11 is the upper surface of the first stop layer 12 of the laser chip 1, and the bottom surface of the second groove 21 is the upper surface of the second stop layer 22 of the silicon-based optoelectronic chip 2. It should be understood that in the production process of the laser chip 1, there is usually a stop layer (etching stop layer) with a thickness of several tens of nanometers above the active layer (the first waveguide layer). The bottom surface of the first groove 11 stays precisely above the upper surface of the stop layer. For the same reason, during the production process of the silicon-based optoelectronic chip 2, a stop layer (etching stop layer), such as a dielectric layer of silicon nitride or polysilicon, will also be introduced above the silicon waveguide (the second waveguide layer). The bottom surface of the second groove 21 stays precisely above the upper surface of the stop layer.

Step S3: fabricating the transfer mold 3 by etching after the etching of the first groove 11 and the second groove 21 is completed, specifically, a plurality of first protrusions 31 corresponding to the plurality of first grooves 11 one-to-one and a plurality of second protrusions 32 corresponding to the plurality of second grooves 21 one-to-one are etched on the transfer mold 3, the first grooves 11 and the first protrusions 31 are used to precisely align the laser chip 1, the second grooves 21 and the second protrusions 32 are used to accurately realize the coupling alignment of the laser chip 1 and the silicon-based optoelectronic chip 2; wherein the number of the first protrusions 31 is the same as the number of the first grooves 11, and the number of the second protrusions 32 is the same as the number of the second grooves 21, the height of the first protrusion 31 is greater than the depth of the first groove 11, and the height of the second protrusion 32 is greater than the depth of the second groove 21.

Step S4: etching through holes 33 which penetrate the first protrusions 31 and the substrate 34 on the transfer mold 3, the number of the through holes 33 is the same as the number of the first protrusions 31; specifically, under a condition that the surface of the first protrusions 31 is dry etched and the height difference between the first protrusion 31 and the second protrusion 32 keeps unchanged, the local area of the first protrusions 31 is etched until the etching penetrates the transfer mold 3 to form the through hole 33.

Figure 12:
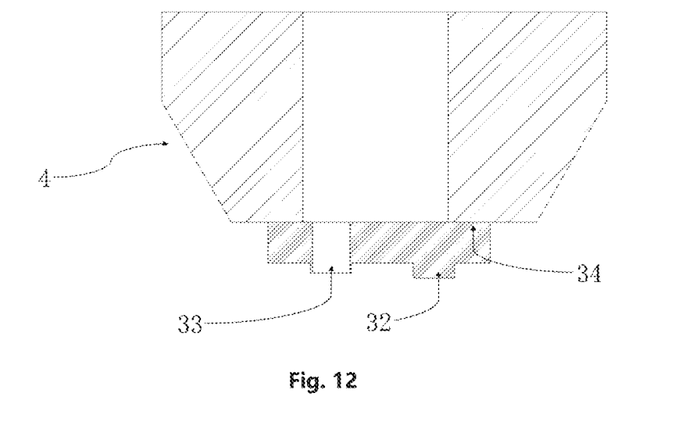
FIG. 12 is a schematic diagram of a longitudinal cross-sectional structure of the connection relationship between the transfer mold and the flip-chip welding tip.
Figure 13:
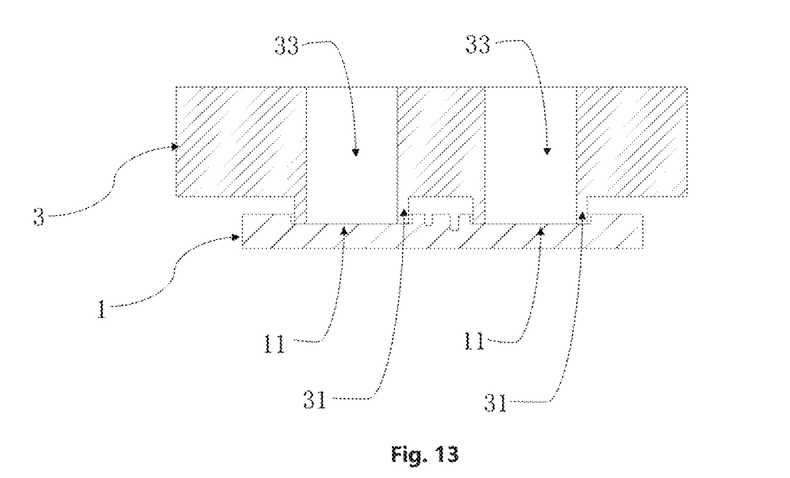
FIG. 13 is a schematic diagram of the connection relationship between the laser chip and the transfer mold.

Step S5: as shown in FIG. 12, connecting the flip-chip welding tip 4 to the transfer mold 3, preferably, the flip-chip welding tip 4 and the transfer mold 3 are tightly connected by gluing, so that the transfer mold 3 and the flip-chip welding tip 4 are fixedly connected to form a new jig; as shown in FIG. 13 the laser chip 1 and the transfer mold 3 are aligned and contacted with the plurality of first protrusions 31 and the plurality of first grooves 11 are fixed in a one-to-one correspondence, the flip-chip welding tip 4 picks up the laser chip 1 via the through holes of the transfer mold, the through holes are used to transmit the suction force of the flip-chip welding tip 4, and the laser chip 1 is sucked and fixed under the transfer mold 3, the laser chip 1 is in a state to be transferred. In this step S5, the top surfaces of the first protrusions 31 and the bottom surfaces of the first grooves 11 are attached in a one-to-one correspondence; and through specially designed alignment shapes, the alignment of the first protrusion 31 and the first groove 11 in the height direction is simple and quick, the rotation and movement in horizontal directions are restricted, and the alignment accuracy is high.

Figure 14:
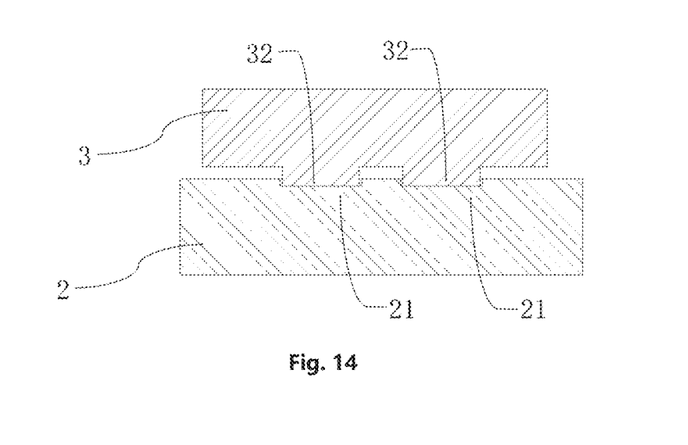
FIG. 14 is a schematic diagram of the connection relationship between the silicon-based optoelectronic chip and the transfer mold.
Figure 15:
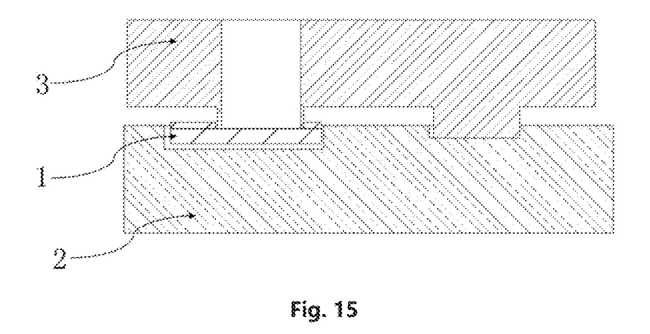
FIG. 15 is a schematic diagram of the longitudinal cross-sectional structure of the transfer mold transferring the laser chip to the silicon-based optoelectronic chip.
Figure 16:
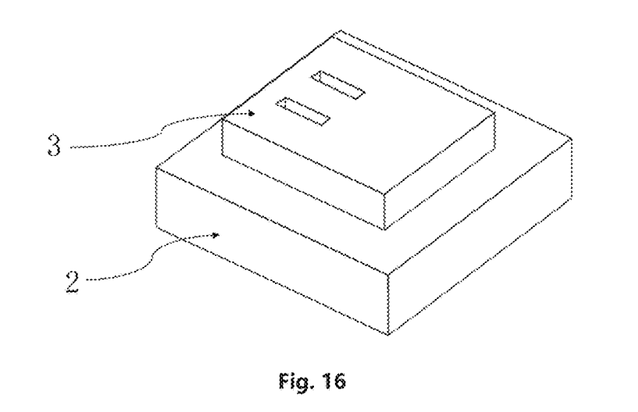
FIG. 16 is a schematic diagram of the assembly of the transfer mold to transfer the laser chip to the silicon-based optoelectronic chip.
Figure 17:
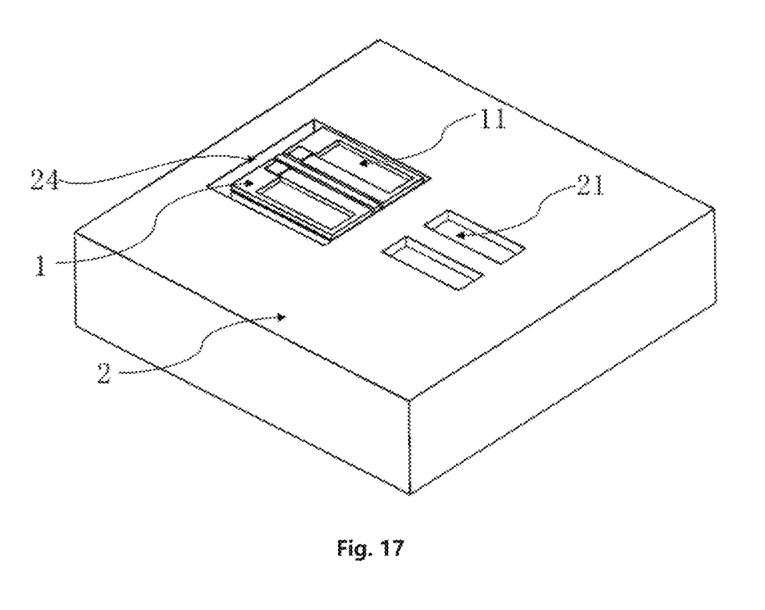
FIG. 17 is a schematic diagram of the assembly of a coupled and aligned laser chip and a silicon-based optoelectronic chip.

Step S6: as shown in FIG. 14, making the transfer mold 3 in alignment and contact with the silicon-based optoelectronic chip 2 by means of a one-to-one correspondence fixing between the plurality of second protrusions 32 and the plurality of second grooves 21, and transferring and putting the laser chip 1 into the accommodating chamber 24 of the silicon-based optoelectronic chip 2 (shown in FIGS. 15, 16 and 17), so that the light field of the first waveguide layer 13 of the laser chip 1 and the light field of the second waveguide layer 23 of the silicon-based optoelectronic chip 2 being coupled and aligned, then completing coupling alignment of the light field of the first waveguide layer 13 of the laser chip 1 and the light field of the second waveguide layer 23 of the silicon-based optoelectronic chip 2 (as shown in FIG. 18). In step S6 of this embodiment, the top surface of each second protrusion 32 and the bottom surface of each second groove 21 are attached in a one-tip-one correspondence, and through specially designed alignment shapes, the alignment of the second protrusion 32 and the second groove 21 in the height direction is simple and quick, the rotation and movement in horizontal directions are restricted, and the alignment accuracy is high.

The method also comprises step S7: after the laser chip 1 being put into the accommodating chamber 24 where glue is pre applied, making the laser chip 1 and the glue in the accommodating chamber 24 from initial curing to complete curing by flip-chip welding, and making the laser chip 1 completely cured and attached in the accommodating chamber 24, then the flip-chip welding tip 4 closing the suction and no longer generating suction, the laser chip 1 being detached from the transfer mold 3, the flip-chip welding tip and the transfer mold leaving the laser chip 1 at the same time, the first protrusion 31 and the second protrusion 32 leaving the first groove 11 and the second groove 21 at the same time, and the flip-chip welding tip 4 and the transfer mold 3 entering the next transfer of the laser chip 1, i.e., entering the next coupling alignment of the laser chip and the silicon-based optoelectronic chip. In this way, a transfer mold can be reused and recycled to complete the packaging of laser chips and silicon-based optoelectronic chips for many times.

Under the condition that the laser conditions remain unchanged, the same transfer mold and the same method can still be used for subsequent coupling alignment of laser chip, so this method can accomplish large-scale and mass-produced high-efficiency flip-chip coupled and aligned laser chip.

In this embodiment, there are at least two pairs of protrusions and grooves, that is, at least a first protrusion/first groove and a second protrusion/second groove are provided, and a third protrusion/third groove may also be provided, to ensure the alignment of the two chips in horizontal directions (there is no rotation angle) and in the height direction. The protrusions and grooves are designed with special shapes, and may adopt polygonal and similar structures, achieving high alignment accuracy or forming self-alignment through minor displacements in a single axial direction. To sum up, the present disclosure realizes the self-alignment of x, y, z axes and three rotation angles, and the alignment precision is high.

The above descriptions are only preferred embodiments of the present disclosure, and are not intended to limit the present disclosure. Any modifications, equivalent replacements and simple improvements made in the essence of the present disclosure should be included in the protection scope of the present disclosure.

INDUSTRIAL APPLICABILITY

According to the coupling alignment device and method for laser chip and silicon-based optoelectronic chip of the present disclosure, by aligning and contacting the laser chip and the silicon-based optoelectronic chip with a transfer mold respectively, the laser chip is skillfully transferred to an accommodating chamber of the silicon-based optoelectronic chip, and the transfer package is completed. Therefore, the coupling package of the laser chip and the silicon-based optoelectronic chip can be completed with high efficiency, high precision and low cost. Besides, by innovatively designing the alignment shapes of the protrusion and the groove, the work efficiency of coupling alignment is improved, thereby realizing batch packaging of laser chips. The coupling alignment method for laser chip and silicon-based optoelectronic chip according to embodiments of the present disclosure is a coupling packaging technology of the laser chip and the silicon-based optoelectronic chip based on transfer and flip-chip welding, which can significantly reduce the difficulty of the packaging process, thereby better solving the problems existing in the prior art such as low efficiency, low precision and high cost.

The invention claimed is:

1. A coupling alignment device for laser chip and silicon-based optoelectronic chip, comprising a transfer mold,
the transfer mold comprises a substrate, a first protrusion and a second protrusion;
the first protrusion and the second protrusion are both fixedly connected to the substrate;
the first protrusion of the transfer mold is etched to form through hole, which penetrates through the first protrusion and the substrate;
the first protrusion is used to be inserted into a first groove of the laser chip, and the second protrusion is used to be inserted into a second groove of the silicon-based optoelectronic chip.

2. The coupling alignment device for laser chip and silicon-based optoelectronic chip according to claim 1, wherein, the height of the first protrusion is greater than the depth of the first groove.

3. The coupling alignment device for laser chip and silicon-based optoelectronic chip according to claim 1, wherein, the height of the second protrusion is greater than the depth of the second groove.

4. The coupling alignment device for laser chip and silicon-based optoelectronic chip according to claim 1, wherein, the first protrusion and the second protrusion are under the substrate.

5. The coupling alignment device for laser chip and silicon-based optoelectronic chip according to claim 4, wherein, the substrate, the first protrusion and the second protrusion are integrated into one structure.

6. The coupling alignment device for laser chip and silicon-based optoelectronic chip according to claim 1, wherein, a cross section of the first protrusion and/or the second protrusion is a polygon.

7. The coupling alignment device for laser chip and silicon-based optoelectronic chip according to claim 1, wherein, the number of the first protrusions is multiple and the number of the second protrusions is multiple.

8. A coupling alignment method for laser chip and silicon-based optoelectronic chip, wherein the method comprising the following steps:
step S1: determining the depth of a first groove on a laser chip according to a first stop layer of the laser chip, determining the depth of a second groove on a silicon-based optoelectronic chip according to a second stop layer of the silicon-based optoelectronic chip, determining the height of a first protrusion to be formed on a transfer mold according to the depth of the first groove, determining the height of a second protrusion to be formed on the transfer mold according to the depth of the second groove, and determining the height difference between the first protrusion and the second protrusion;

step S2: etching a plurality of the first grooves on the laser chip, and stopping at an upper surface of the first stop layer; etching a plurality of the second grooves on the silicon-based optoelectronic chip, and stopping at an upper surface of the second stop layer;

step S3: etching a plurality of the first protrusions corresponding to a plurality of the first grooves one-to-one and a plurality of the second protrusions corresponding to a plurality of the second grooves one-to-one on the transfer mold; wherein, the number of the first protrusions is the same as the number of the first grooves, the number of the second protrusions is the same as the number of the second grooves, the height of the first protrusion is greater than the depth of the first groove, and the height of the second protrusion is greater than the depth of the second groove;

step S4: etching through holes which penetrate through the first protrusion and the substrate on the transfer mold, and the number of the through holes is the same as the number of the first protrusions;

step S5: connecting a flip-chip welding tip to the transfer mold, the transfer mold is aligned and contacted with the laser chip by fixing the first protrusions and the first grooves one-to-one correspondingly, and the flip-chip welding tip picks up the laser chip via the through holes of the transfer mold;

step S6: making the transfer mold in alignment and contacting with the silicon-based optoelectronic chip by fixing the second protrusions and the second grooves one-to-one correspondingly, and putting the laser chip into the accommodating chamber of the silicon-based optoelectronic chip, then completing coupling alignment of the laser chip and the silicon-based optoelectronic chip.

9. The coupling alignment method for laser chip and silicon-based optoelectronic chip according to claim 8, wherein, in the step S1, a bottom surface of the first groove is the upper surface of the first stop layer of the laser chip, and a bottom surface of the second groove is the upper surface of the second stop layer of the silicon-based optoelectronic chip;

a height difference between the first protrusion and the second protrusion is a height difference between the top surface of the first protrusion and the top surface of the second protrusion, and the height difference between the top surface of the first protrusion and the top surface of the second protrusion is determined as follows:

$$\Delta h = h1 - h2 - t1 - 0.5 \cdot t2 + 0.5 \cdot t3;$$

wherein, $\Delta h$ represents the height difference between the top surface of the first protrusion and the top surface of the second protrusion, $h1$ represents a height difference between the center of the second stop layer and the center of a second waveguide layer of the silicon-based optoelectronic chip, $h2$ represents the height difference between the center of a first waveguide layer and the center of the second waveguide layer when the laser chip and the silicon-based optoelectronic chip are optimally coupled, $t1$ represents the thickness of the first stop layer of the laser chip, $t2$ represents the thickness of the first waveguide layer of the laser chip, and $t3$ represents the thickness of the second stop layer of the silicon-based optoelectronic chip.

10. The coupling alignment method for laser chip and silicon-based optoelectronic chip according to claim 8, further comprising:

step S7: after curing the glue in the accommodating chamber where the laser chip is placed by flip-chip, turning off the vacuum, the flip-chip welding tip and the transfer mold leave the laser chip at the same time and enter into the next coupling alignment experiment of laser chips and silicon-based optoelectronic chips.

* * * * *